(12) United States Patent
Hu et al.

(10) Patent No.: US 12,483,454 B2
(45) Date of Patent: Nov. 25, 2025

(54) SCALABLE WAVEFORM AND NUMEROLOGY DESIGNS FOR NEXT-GENERATION WLAN IN 60GHz FREQUENCY BAND

(71) Applicant: MediaTek Inc., Hsinchu (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc. (TW)

( * ) Notice: Subject to any disclaimer, the term of this patent is extended or adjusted under 35 U.S.C. 154(b) by 195 days.

(21) Appl. No.: 18/118,368

(22) Filed: Mar. 7, 2023

(65) Prior Publication Data

US 2023/0300011 A1 Sep. 21, 2023

Related U.S. Application Data

(60) Provisional application No. 63/330,334, filed on Apr. 13, 2022, provisional application No. 63/321,321, filed on Mar. 18, 2022.

(51) Int. Cl.
*H04L 27/26* (2006.01)
*H04L 5/00* (2006.01)
*H04W 84/12* (2009.01)

(52) U.S. Cl.
CPC ...... *H04L 27/26025* (2021.01); *H04L 5/0094* (2013.01); *H04L 27/2605* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,447,448 B2 | 10/2019 | Park et al. | |
| 10,791,545 B2 | 9/2020 | Bang | |
| 2003/0171115 A1 | 9/2003 | Batra et al. | |
| 2016/0021568 A1* | 1/2016 | Yu | H04L 5/0048 370/329 |
| 2016/0198345 A1 | 7/2016 | Fan et al. | |

(Continued)

FOREIGN PATENT DOCUMENTS

| | | |
|---|---|---|
| CN | 103118432 A | 5/2013 |
| CN | 107925550 A | 4/2018 |

(Continued)

OTHER PUBLICATIONS

Taiwan Intellectual Property Office, Office Action in Taiwan Patent Application No. 112109991, Jul. 31, 2023.

(Continued)

*Primary Examiner* — Diane L Lo
(74) *Attorney, Agent, or Firm* — Andy M. Han; Han IP PLLC

(57) ABSTRACT

Techniques pertaining to scalable waveform and numerology designs for next-generation wireless local area networks (WLANs) in 60 GHz frequency band are described. A first apparatus communicates in a 60 GHz frequency band wirelessly with a second apparatus based on a scalable waveform and numerology design with at least one of: (i) selection of a specific subcarrier spacing (SCS); (ii) selection of a specific guard interval (GI) design; and (iii) reuse of a preexisting channelization or tone plan.

6 Claims, 22 Drawing Sheets

(56) References Cited

U.S. PATENT DOCUMENTS

| | | |
|---|---|---|
| 2016/0323890 A1 | 11/2016 | Cordeiro |
| 2017/0070995 A1 | 3/2017 | Eitan et al. |
| 2017/0180174 A1 | 6/2017 | Park et al. |
| 2017/0338927 A1* | 11/2017 | Park .................... H04L 5/0044 |
| 2017/0338928 A1 | 11/2017 | Park et al. |
| 2018/0254805 A1 | 9/2018 | Sadri |
| 2018/0352445 A1 | 12/2018 | Khan |
| 2019/0052395 A1 | 2/2019 | Motozuka |
| 2019/0191414 A1 | 6/2019 | Bang |
| 2019/0208463 A1 | 7/2019 | Lou et al. |
| 2019/0268972 A1 | 8/2019 | Chen |
| 2020/0067748 A1* | 2/2020 | Zhang ............... H04L 27/26025 |
| 2021/0359885 A1 | 11/2021 | Shellhammer et al. |
| 2023/0247603 A1 | 8/2023 | Cariou |
| 2023/0300011 A1 | 9/2023 | Hu |
| 2023/0319874 A1 | 10/2023 | Myung |
| 2024/0179737 A1 | 5/2024 | Tsai |

FOREIGN PATENT DOCUMENTS

| | | |
|---|---|---|
| CN | 110999508 A | 4/2020 |
| CN | 111066361 A | 4/2020 |
| CN | 111279647 A | 6/2020 |
| CN | 114189850 A | 3/2022 |
| WO | WO 2016176097 A1 | 11/2016 |
| WO | WO 2022011000 A1 | 1/2022 |

OTHER PUBLICATIONS

European Patent Office, Extended European Search Report in European Patent Application No. 23162105.3, Aug. 11, 2023.
Taiwan Intellectual Property Office, Office Action in Taiwan Patent Application No. 112109990, Jul. 31, 2023.
European Patent Office, Extended European Search Report in European Patent Application No. 23162055.0, Aug. 11, 2023.
Laurent Cariou (Intel): "Bandwidth signaling for EDMG; 11-16-0954-00-00ay-bandwidth-signaling-for-edmg", IEEE Draft; 11-16-0954-00-00AY-BANDWIDTH-SIGNALING-FOR-EDMG, IEEE-SA Mentor, Piscataway, NJ USA, vol. 802.11ay, Jul. 28, 2016, XP068107310.
USPTO, Office Action in U.S. Appl. No. 18/118,310, filed Jun. 20, 2025.
IEEE 802.11ay-2021: "Wireless LAN Medium Access Control (MAC) and Physical Layer (PHY) Specifications Amendment 2: Enhanced Throughput for Operations in License-exempt Bands above 45 Ghz"; IEEE Computer Society, Jul. 28, 2021.
China National Intelelctual Property Administration, 1st Office Action in China Application No. 202310264411.0, Jul. 25, 2025.
China National Intelelctual Property Administration, 1st Office Action in China Application No. 202310264410.6, Jul. 26, 2025.
IEEE: "Part 11: Wireless LAN Medium Access Control (MAC) and Physical Layer (PHY) Specifications; Amendment 2: Enhanced Throughput for Operations in License-exempt Bands above 45 GHz", Mar. 25, 2021.

* cited by examiner

| | | | | | | |
|---|---|---|---|---|---|---|
| BW (MHz) | 320 | 640 | 960 | 1280 | 1600 | 1920 |
| ΔF (MHz) | 1.25 | 1.25 | 1.875 | 2.5 | 3.125 | 3.75 |
| Tdft (ns) | 800.00 | 800.00 | 533.33 | 400.00 | 320.00 | 266.67 |
| Tgi,short(ns) | 25.00 | 25.00 | 16.67 | 25.00 | 20.00 | 16.67 |
| Tgi,normal(ns) | 50.00 | 50.00 | 33.33 | 50.00 | 40.00 | 33.33 |
| Tgi,long(ns) | 100.00 | 100.00 | 66.67 | 100.00 | 80.00 | 66.67 |
| Tsym(ns) | Tdft+Tgi | Tdft+Tgi | Tdft+Tgi | Tdft+Tgi | Tdft+Tgi | Tdft+Tgi |
| Fs(MHz) | 320 | 640 | 960 | 1280 | 1600 | 1920 |
| Nfft | 256 | 512 | 512 | 512 | 512 | 512 |
| Nsd | 234 | 468 | 468 | 468 | 468 | 468 |
| Nsp | 8 | 16 | 16 | 16 | 16 | 16 |
| Ndc | 3 | 5 | 5 | 5 | 5 | 5 |
| Nst | 242 | 484 | 484 | 996 | 484 | 484 |
| Nguard (left,right) | (6,5) | (12,11) | (12,11) | (12,11) | (12,11) | (12,11) |
| Tone Plan | 11be, BW20/RU242 Or 11ac/BW80 | 11be, BW40/RU484 Or 11ac/BW160 | 11be, BW40/RU484 Or 11ac/BW160 | 11be, BW80/RU484 Or 11ac/BW160 | 11be, BW40/RU484 Or 11ac/BW160 | 11be, BW40/RU484 Or 11ac/BW160 |

FIG. 2

| BW (MHz) | 320 | | | | | | |
|---|---|---|---|---|---|---|---|
| ΔF (MHz) | 0.625 | 0.625 | 1.25 | 2.5 | 5 | 5 | 5 |
| Tdft (ns) | 1600.00 | 1600.00 | 800.00 | 400.00 | 200.00 | 200.00 | 200.00 |
| Tgi,short(ns) | 50.00 | 25.00 | 25.00 | 25.00 | 12.50 | 18.75 | 25.00 |
| Tgi,normal(ns) | 100.00 | 50.00 | 50.00 | 50.00 | 25.00 | 37.50 | 50.00 |
| Tgi,long(ns) | 200.00 | 100.00 | 100.00 | 100.00 | 50.00 | 75.00 | 100.00 |
| Tsym(ns) | Tdft+Tgi | Tdft+Tgi | Tdft+Tgi | Tdft+Tgi | Tdft+Tgi | Tdft+Tgi | Tdft+Tgi |
| Fs(MHz) | 320 | 320 | 320 | 320 | 320 | 320 | 320 |
| Nfft | 512 | 512 | 256 | 128 | 64 | 64 | 64 |
| Nsd | 468 | 468 | 234 | 108 | 52 | 52 | 52 |
| Nsp | 16 | 16 | 8 | 6 | 4 | 4 | 4 |
| Ndc | 5 | 5 | 3 | 3 | 1 | 1 | 1 |
| Nst | 484 | 484 | 242 | 114 | 56 | 56 | 56 |
| Nguard (left,right) | (12,11) | (12,11) | (6,5) | (6,5) | (4,3) | (4,3) | (4,3) |
| Tone Plan | 11be,BW40/RU484 Or 11ac/BW160 | 11be,BW40/RU484 Or 11ac/BW160 | 11be,BW40/RU242 Or 11ac/BW80 | 11ac,BW40 | 11ac,BW20 | 11ac,BW20 | 11ac,BW20 |

| | | | | | | | |
|---|---|---|---|---|---|---|---|
| BW(MHz) | 640 | | | | | | |
| ΔF(MHz) | 0.625 | 0.625 | 1.25 | 2.5 | 5 | 5 | 5 |
| Tdft(ns) | 1600.00 | 1600.00 | 800.00 | 400.00 | 200.00 | 200.00 | 200.00 |
| Tgi,short(ns) | 50.00 | 25.00 | 25.00 | 25.00 | 12.50 | 18.75 | 25.00 |
| Tgi,normal(ns) | 100.00 | 50.00 | 50.00 | 50.00 | 25.00 | 37.50 | 50.00 |
| Tgi,long(ns) | 200.00 | 100.00 | 100.00 | 100.00 | 50.00 | 75.00 | 100.00 |
| Tsym(ns) | Tdft+Tgi | Tdft+Tgi | Tdft+Tgi | Tdft+Tgi | Tdft+Tgi | Tdft+Tgi | Tdft+Tgi |
| Fs(MHz) | 640 | 640 | 640 | 640 | 640 | 640 | 640 |
| Nfft | 1024 | 1024 | 512 | 256 | 128 | 128 | 128 |
| Nsd | 980 | 980 | 468 | 234 | 108 | 108 | 108 |
| Nsp | 16 | 16 | 16 | 8 | 6 | 6 | 6 |
| Ndc | 5 | 5 | 5 | 3 | 3 | 3 | 3 |
| Nst | 996 | 996 | 484 | 242 | 114 | 114 | 114 |
| Nguard(left,right) | (12,11) | (12,11) | (12,11) | (6,5) | (6,5) | (6,5) | (6,5) |
| Tone Plan | 11be,BW80/RU996 | 11he,BW80/RU996 Or 11ac/BW160 | 11he,BW40/RU484 Or 11ac/BW80 | 11he,BW20/RU242 | 11ac,BW40 | 11ac,BW40 | 11ac,BW40 |

FIG. 4

| BW (MHz) | | | | | 1280 | | | |
|---|---|---|---|---|---|---|---|---|
| ΔF (MHz) | 0.625 | 0.625 | 1.25 | 2.5 | 5 | 5 | 5 | 5 |
| Tdft (ns) | 1600.00 | 1600.00 | 800.00 | 400.00 | 200.00 | 200.00 | 200.00 | 200.00 |
| Tgi,short(ns) | 50.00 | 25.00 | 25.00 | 25.00 | 25.00 | 12.50 | 18.75 | 25.00 |
| Tgi,normal(ns) | 100.00 | 50.00 | 50.00 | 50.00 | 50.00 | 25.00 | 37.50 | 50.00 |
| Tgi,long(ns) | 200.00 | 100.00 | 100.00 | 100.00 | 100.00 | 50.00 | 75.00 | 100.00 |
| Tsym(ns) | Tdft+Tgi | Tdft+Tgi | Tdft+Tgi | Tdft+Tgi | Tdft+Tgi | Tdft+Tgi | Tdft+Tgi | Tdft+Tgi |
| Fs(MHz) | 1280 | 1280 | 1280 | 1280 | 1280 | 1280 | 1280 | 1280 |
| Nfft | 2048 | 2048 | 1024 | 512 | 256 | 256 | 256 | 256 |
| Nsd | 1960 | 1960 | 980 | 468 | 234 | 234 | 234 | 234 |
| Nsp | 32 | 32 | 16 | 16 | 8 | 8 | 8 | 8 |
| Ndc | 5 | 5 | 5 | 5 | 3 | 3 | 3 | 3 |
| Nst | 2x996 | 2x996 | 996 | 484 | 242 | 242 | 242 | 242 |
| Nguard (left, right) | (12,11) | (12,11) | (12,11) | (12,11) | (6,5) | (6,5) | (6,5) | (6,5) |
| Tone Plan | 11be, BW160/RU2x996 | 11be, BW160/RU2x996 | 11be, BW80/RU996 | 11be, BW40/RU484 Or 11ac/BW160 | 11be, BW20/RU242 Or 11ac/BW80 | 11be, BW20/RU242 Or 11ac/BW80 | 11be, BW20/RU242 Or 11ac/BW80 | 11be, BW20/RU242 Or 11ac/BW80 |

FIG. 5

| BW (MHz) | 960 | | |
|---|---|---|---|
| ΔF (MHz) | 0.9375 | 1.875 | 3.75 |
| Tdft (ns) | 1066.67 | 533.33 | 266.67 |
| Tgi,short(ns) | 16.67 | 16.67 | 16.67 |
| Tgi,normal(ns) | 33.33 | 33.33 | 33.33 |
| Tgi,long(ns) | 66.67 | 66.67 | 66.67 |
| Tsym(ns) | Tdft+Tgi | Tdft+Tgi | Tdft+Tgi |
| Fs(MHz) | 960 | 960 | 960 |
| Nff | 1024 | 512 | 256 |
| Nsd | 980 | 468 | 234 |
| Nsp | 16 | 16 | 8 |
| Ndc | 5 | 5 | 3 |
| Nst | 996 | 484 | 242 |
| Nguard (left,right) | (12,11) | (12,11) | (6,5) |
| Tone Plan | 11be, BW80/RU996 | 11be, BW40/RU484 Or 11ac/BW160 | 11be, BW20/RU242 Or 11ac/BW80 |

FIG. 6

| BW (MHz) | | 1600 | |
|---|---|---|---|
| ΔF (MHz) | 0.78125 | 1.5625 | 3.125 |
| Tdft (ns) | 1280.00 | 640.00 | 320.00 |
| Tgi,short(ns) | 20.00 | 20.00 | 20.00 |
| Tgi,normal(ns) | 40.00 | 40.00 | 40.00 |
| Tgi,long(ns) | 80.00 | 80.00 | 80.00 |
| Tsym(ns) | Tdft+Tgi | Tdft+Tgi | Tdft+Tgi |
| Fs(MHz) | 1600 | 1600 | 1600 |
| Nfft | 2048 | 1024 | 512 |
| Nsd | 1960 | 980 | 468 |
| Nsp | 32 | 16 | 16 |
| Ndc | 5 | 5 | 5 |
| Nst | 2x996 | 996 | 484 |
| Nguard(left,right) | (12,11) | (12,11) | (12,11) |
| Tone Plan | 11be, BW160/RU2x996 | 11be, BW80/RU996 | 11be, BW40/RU484 Or 11ac/BW160 |

FIG. 7

| BW (MHz) | | 11be, BW160/RU2x996 | 11be, BW80/RU996 | 11be, BW40/RU484 Or 11ac/BW160 |
|---|---|---|---|---|
| ΔF (MHz) | | 0.9375 | 1920 | 3.75 |
| Tdft (ns) | | 1066.67 | 1.875 | 266.67 |
| Tgi,short(ns) | | 16.67 | 533.33 | 16.67 |
| Tgi,normal(ns) | | 33.33 | 16.67 | 33.33 |
| Tgi,long(ns) | | 66.67 | 33.33 | 66.67 |
| Tsym(ns) | | Tdft+Tgi | 66.67 | Tdft+Tgi |
| Fs(MHz) | | 1920 | Tdft+Tgi | 1920 |
| Nff | | 2048 | 1920 | 512 |
| Nsd | | 1960 | 1024 | 468 |
| Nsp | | 32 | 980 | 16 |
| Ndc | | 5 | 16 | 5 |
| Nst | | 2x996 | 5 | 484 |
| Nguard (left,right) | | (12,11) | 996 | (12,11) |
| Tone Plan | | | (12,11) | |

| BW (MHz) | | | |
|---|---|---|---|
| ΔF (MHz) | 0.9375 | 1.875 | 3.75 |
| Tdft (ns) | 1066.67 | 533.33 | 266.67 |
| Tgi,short(ns) | 16.67 | 16.67 | 16.67 |
| Tgi,normal(ns) | 33.33 | 33.33 | 33.33 |
| Tgi,long(ns) | 66.67 | 66.67 | 66.67 |
| Tsym(ns) | Tdft+Tgi | Tdft+Tgi | Tdft+Tgi |
| Fs(MHz) | 3840 | 3840 | 3840 |
| Nfft | 4096 | 2048 | 1024 |
| Nsd | 3920 | 1960 | 980 |
| Nsp | 64 | 32 | 16 |
| Ndc | 5 | 5 | 5 |
| Nst | 4x996 | 2x996 | 996 |
| Nguard(left,right) | (12,11) | (12,11) | (12,11) |
| Tone Plan | 11be, BW320/RU4x996 | 11be, BW160/RU2x996 | 11be, BW80/RU996 |

| BW (MHz) | 1920 | 3840 |
|---|---|---|
| ΔF (MHz) | 2.5 | 2.5 |
| Tdft (us) | 0.4 | 0.4 |
| Tgi,short(us) | 0.025 | 0.025 |
| Tgi,normal(us) | 0.05 | 0.05 |
| Tgi,long(us) | 0.1 | 0.1 |
| Tsym(us) | Tdft+Tgi | Tdft+Tgi |
| Fs(MHz) | 1920 | 3840 |
| Nfft | 768 | 1536 |
| Nsd | 234+468 | 468+980 |
| Nsp | 24 | 32 |
| Ndc | 5 | 5 |
| Nst | 242+484 | 484+996 |
| Nguard (left,right) | (12,11) | (12,11) |
| Tone Plan | RU(242+484) | RU(484+996) |

| BW(MHz) | 540 | |
|---|---|---|
| ΔF (MHz) | 2.109375 | 4.21875 |
| Tdft (ns) | 474.074 | 237.037 |
| Tgi,short(ns) | 29.630 | 14.815 |
| Tgi,normal(ns) | 59.259 | 29.630 |
| Tgi,long(ns) | 118.519 | 59.259 |
| Tsym(ns) | Tdft+Tgi | Tdft+Tgi |
| Fs(MHz) | 540 | 540 |
| Nfft | 256 | 128 |
| Nsd | 234 | 108 |
| Nsp | 8 | 6 |
| Ndc | 3 | 3 |
| Nst | 242 | 114 |
| Nguard(left,right) | (6,5) | (6,5) |
| Tone Plan | 11be, BW20/RU242 Or 11ac/BW80 | 11ac, BW40 |

| BW(MHz) | 480 | | |
|---|---|---|---|
| ΔF (MHz) | 0.9375 | 1.875 | 3.75 |
| Tdft (ns) | 1066.667 | 533.333 | 266.667 |
| Tgi,short(ns) | 66.667 | 33.333 | 16.667 |
| Tgi,normal(ns) | 133.333 | 66.667 | 33.333 |
| Tgi,long(ns) | 266.667 | 133.333 | 66.667 |
| Tsym(ns) | Tdft+Tgi | Tdft+Tgi | Tdft+Tgi |
| Fs(MHz) | 480 | 480 | 480 |
| Nfft | 512 | 256 | 128 |
| Nsd | 468 | 234 | 108 |
| Nsp | 16 | 8 | 6 |
| Ndc | 5 | 3 | 3 |
| Nst | 484 | 242 | 114 |
| Nguard(left,right) | (12,11) | (6,5) | (6,5) |
| Tone Plan | 11be, BW40/RU484 Or 11ac/BW160 | 11be, BW20/RU242 Or 11ac/BW80 | 11ac, BW40 |

FIG. 13

| BW (MHz) |  | 520 | 520 | 500 | 500 | 1000 | 1000 |
|---|---|---|---|---|---|---|---|
| ΔF (MHz) | 1.015625 | 2.03125 | 4.0625 | 1.953125 | 3.90625 | 1.953125 | 3.90625 |
| Tdft (ns) | 984.615 | 492.308 | 246.154 | 512.000 | 256.000 | 512.000 | 256.000 |
| Tgi,short(ns) | 61.538 | 30.769 | 15.385 | 32.000 | 16.000 | 32.000 | 16.000 |
| Tgi,normal(ns) | 123.077 | 61.538 | 30.769 | 64.000 | 32.000 | 64.000 | 32.000 |
| Tgi,long(ns) | 246.154 | 123.077 | 61.538 | 128.000 | 64.000 | 128.000 | 64.000 |
| Tsym(ns) | Tdft+Tgi | Tdft+Tgi | Tdft+Tgi | Tdft+Tgi | Tdft+Tgi | Tdft+Tgi | Tdft+Tgi |
| Fs(MHz) | 520 | 520 | 520 | 500 | 500 | 1000 | 1000 |
| Nfft | 512 | 256 | 128 | 256 | 128 | 512 | 256 |
| Nsd | 468 | 234 | 108 | 234 | 108 | 468 | 234 |
| Nsp | 16 | 8 | 6 | 8 | 6 | 16 | 8 |
| Ndc | 5 | 3 | 3 | 3 | 3 | 5 | 3 |
| Nst | 484 | 242 | 114 | 242 | 114 | 484 | 242 |
| Nguard (left,right) | (12,11) | (6,5) | (6,5) | (6,5) | (6,5) | (12,11) | (6,5) |
| Tone Plan | 11be, BW40/RU484 Or 11ac/BW160 | 11be, BW20/RU242 Or 11ac/BW80 | 11ac, BW40 | 11be, BW20/RU242 Or 11ac/BW80 | 11ac, BW40 | 11be, BW40/RU484 | 11be, BW20/RU242 |

| BW (MHz) | | | |
|---|---|---|---|
| ΔF (MHz) | 1.40625 | 2.8125 | 5.625 |
| Tdft (ns) | 711.11 | 355.56 | 177.78 |
| Tgi,short(ns) | 22.22 | 22.22 | 22.22 |
| Tgi,normal(ns) | 44.44 | 44.44 | 44.44 |
| Tgi,long(ns) | 88.89 | 88.89 | 44.44 |
| Tsym(ns) | Tdft+Tgi | Tdft+Tgi | Tdft+Tgi |
| Fs(MHz) | 5760 | 5760 | 5760 |
| Nfft | 4096 | 2048 | 1024 |
| Nsd | 3920 | 1960 | 960 |
| Nsp | 64 | 32 | 16 |
| Ndc | 23 | 23 | 5 |
| Nst | 4x996 | 2x996 | 996 |
| Nguard (left,right) | (12,11) | (12,11) | (12,11) |
| Tone Plan | 11be, BW320/RU4x996 | 11be, BW160/RU2x996 | 11be, BW80/RU996 |

| | 1600 | |
|---|---|---|
| BW (MHz) | 6000 | |
| ΔF (MHz) | 5.859375 | |
| Tdft (ns) | 170.67 | |
| Tgi,short(ns) | 21.33 | |
| Tgi,normal(ns) | 42.67 | |
| Tgi,long(ns) | 85.33 | |
| Tsym(ns) | Tdft+Tgi | |
| Fs(MHz) | 6000 | |
| Nfft | 1024 | |
| Nsd | 980 | |
| Nsp | 16 | |
| Ndc | 5 | |
| Nst | 996 | |
| Nguard (left,right) | (12,11) | |
| Tone Plan | 11be, BW80/RU996 | |

| | | |
|---|---|---|
| BW (MHz) | 6240 | |
| ΔF (MHz) | 3.046875 | |
| Tdft (ns) | 328.21 | |
| Tgi,short(ns) | 20.51 | |
| Tgi,normal(ns) | 41.03 | |
| Tgi,long(ns) | 82.05 | |
| Tsym(ns) | Tdft+Tgi | |
| Fs(MHz) | 6240 | |
| Nfft | 2048 | |
| Nsd | 1960 | |
| Nsp | 32 | |
| Ndc | 23 | |
| Nst | 2x996 | |
| Nguard (left,right) | (12,11) | |
| Tone Plan | 11be, BW160/RU2x996 | |

| | | |
|---|---|---|
| BW (MHz) | 6480 | |
| ΔF (MHz) | 6.328125 | |
| Tdft (ns) | 158.02 | |
| Tgi,short(ns) | 19.75 | |
| Tgi,normal(ns) | 39.51 | |
| Tgi,long(ns) | 39.51 | |
| Tsym(ns) | Tdft+Tgi | |
| Fs(MHz) | 6480 | |
| Nfft | 1024 | |
| Nsd | 980 | |
| Nsp | 16 | |
| Ndc | 5 | |
| Nst | 996 | |
| Nguard (left,right) | (12,11) | |
| Tone Plan | 11be, BW80/RU996 | |

FIG. 16

| | | | | | | | |
|---|---|---|---|---|---|---|---|
| BW (MHz) | | | | 1280 | | | |
| SCS (MHz) | 0.625 | 0.625 | 1.25 | 2.5 | 5 | 5 | 5 |
| Tdft (ns) | 1600.00 | 1600.00 | 800.00 | 400.00 | 200.00 | 200.00 | 200.00 |
| Tgi,short(ns) | 50.00 | 25.00 | 25.00 | 25.00 | 12.50 | 18.75 | 25.00 |
| Tgi,normal(ns) | 100.00 | 50.00 | 50.00 | 50.00 | 25.00 | 37.50 | 50.00 |
| Tgi,long(ns) | 200.00 | 100.00 | 100.00 | 100.00 | 50.00 | 75.00 | 100.00 |
| Tsym(ns) | Tdft+Tgi | Tdft+Tgi | Tdft+Tgi | Tdft+Tgi | Tdft+Tgi | Tdft+Tgi | Tdft+Tgi |
| Fs(MHz) | 1280 | 1280 | 1280 | 1280 | 1280 | 1280 | 1280 |
| Nfft | 2048 | 2048 | 1024 | 512 | 256 | 256 | 256 |
| Nsd | 1960 | 1960 | 980 | 468 | 234 | 234 | 234 |
| Nsp | 32 | 32 | 16 | 16 | 8 | 8 | 8 |
| Ndc | 5 | 5 | 5 | 5 | 3 | 3 | 3 |
| Nst | 2x996 | 2x996 | 996 | 484 | 242 | 242 | 242 |
| Nguard (left,right) | (12,11) | (12,11) | (12,11) | (12,11) | (6,5) | (6,5) | (6,5) |
| Tone Plan | 11be, BW160/RU2x996 | 11be, BW160/RU2x996 | 11be, BW80/RU996 | 11be, BW40/RU484 or 11ac/BW160 | 11be, BW20/RU242 or 11ac/BW80 | 11be, BW20/RU242 or 11ac/BW80 | 11be, BW20/RU242 or 11ac/BW80 |

FIG. 17

| BW (MHz) | | | | | |
|---|---|---|---|---|---|
| SCS (MHz) | 0.625 | 0.625 | 1.25 | 2.5 | 5 |
| Tdft (ns) | 1600.00 | 1600.00 | 800.00 | 400.00 | 200.00 |
| Tg,short(ns) | 50.00 | 25.00 | 25.00 | 25.00 | 12.50 |
| Tg,normal(ns) | 100.00 | 50.00 | 50.00 | 50.00 | 25.00 |
| Tg,long(ns) | 200.00 | 100.00 | 100.00 | 100.00 | 50.00 |
| Tsym(ns) | Tdft+Tgi | Tdft+Tgi | Tdft+Tgi | Tdft+Tgi | Tdft+Tgi |
| Fs(MHz) | 2560 | 2560 | 2560 | 2560 | 2560 |
| Nfft | 4096 | 4096 | 2048 | 1024 | 512 |
| Nsd | 4x980 | 4x980 | 1960 | 980 | 468 |
| Nsp | 64 | 64 | 32 | 16 | 16 |
| Ndc | 23 | 23 | 23 | 5 | 5 |
| Nst | 4x996 | 4x996 | 2x996 | 996 | 484 |
| Nguard (left,right) | (12,11) | (12,11) | (12,11) | (12,11) | (12,11) |
| Tone Plan | 11be, BW320/RU4x996 | 11be, BW320/RU4x980 | 11be, BW160/RU2x996 | 11be, BW80/RU996 | 11be, BW40/RU484, or 11ac/BW160 |

| | 11be, BW320/RU4x996 | 11be, BW160/RU2x996 | 11be, BW80/RU996 |
|---|---|---|---|
| BW (MHz) | | 5120 | |
| SCS (MHz) | 1.25 | 2.5 | 5 |
| Tdft (ns) | 800.00 | 400.00 | 200.00 |
| Tgi,short(ns) | 25.00 | 25.00 | 12.50 |
| Tgi,normal(ns) | 50.00 | 50.00 | 25.00 |
| Tgi,long(ns) | 100.00 | 100.00 | 50.00 |
| Tsym(ns) | Tdft+Tgi | Tdft+Tgi | Tdft+Tgi |
| Fs(MHz) | 5120 | 5120 | 5120 |
| Nfft | 4096 | 2048 | 1024 |
| Nsd | 980*4 | 980*2 | 980 |
| Nsp | 64 | 32 | 16 |
| Ndc | 23 | 23 | 5 |
| Nst | 4x996 | 2x996 | 996 |
| Nguard (left,right) | (12,11) | (12,11) | (12,11) |
| Tone Plan | | | |

FIG. 19

| | | | | |
|---|---|---|---|---|
| BW (MHz) | 160 | | | |
| SCS (MHz) | 0.625 | 0.625 | 1.25 | 2.5 |
| Tdft (ns) | 1600.00 | 1600.00 | 800.00 | 400.00 |
| Tgi,short (ns) | 50.00 | 25.00 | 25.00 | 25.00 |
| Tgi,normal (ns) | 100.00 | 50.00 | 50.00 | 50.00 |
| Tgi,long (ns) | 200.00 | 100.00 | 100.00 | 100.00 |
| Tsym (ns) | Tdft+Tgi | Tdft+Tgi | Tdft+Tgi | Tdft+Tgi |
| Fs (MHz) | 160 | 160 | 160 | 160 |
| Nfft | 256 | 256 | 128 | 64 |
| Nsd | 234 | 234 | 108 | 52 |
| Nsp | 8 | 8 | 6 | 4 |
| Ndc | 3 | 3 | 3 | 1 |
| Nst | 242 | 242 | 114 | 56 |
| Nguard (left,right) | (6,5) | (6,5) | (6,5) | (4,3) |
| Tone Plan | 11be, BW20/RU242, or 11ac/BW80 | 11be, BW20/RU242, or 11ac/BW80 | 11ac, BW40 | 11ac, BW20 |

COMMUNICATE, BY A PROCESSOR OF A FIRST APPARATUS, IN A 60GHz BAND WIRELESSLY WITH A SECOND APPARATUS BASED ON A SCALABLE WAVEFORM AND NUMEROLOGY DESIGN WITH AT LEAST ONE OF:

- SELECTION OF A SPECIFIC SUBCARRIER SPACING (SCS);
- SELECTION OF A SPECIFIC GUARD INTERVAL (GI) DESIGN; AND
- REUSE OF A PREEXISTING CHANNELIZATION OR TONE PLAN

2210

TRANSMIT FIRST DATA OR FIRST INFORMATION TO THE SECOND APPARATUS

2212

RECEIVE SECOND DATA OR SECOND INFORMATION FROM THE SECOND APPARATUS

SCALABLE WAVEFORM AND NUMEROLOGY DESIGNS FOR NEXT-GENERATION WLAN IN 60GHz FREQUENCY BAND

CROSS REFERENCE TO RELATED PATENT APPLICATION

The present disclosure is part of a non-provisional patent application claiming the priority benefit of U.S. Provisional Patent Application Nos. 63/321,321, filed 18 Mar. 2022, and 63/330,334, filed 13 Apr. 2022, the contents of which herein being incorporated by reference in their entirety.

TECHNICAL FIELD

The present disclosure is generally related to wireless communications and, more particularly, to scalable waveform and numerology designs for next-generation wireless local area networks (WLANs) in 60 GHz frequency band.

BACKGROUND

Unless otherwise indicated herein, approaches described in this section are not prior art to the claims listed below and are not admitted as prior art by inclusion in this section.

In wireless communications such as Wi-Fi (or WiFi), the 60 GHz frequency band has been used and standardized in Institute of Electrical and Electronics Engineers (IEEE) 802.11ad/ay directional multi-gigabit (DMG) and enhanced directional multi-gigabit (EDMG) systems to achieve higher throughput by utilizing the wide bandwidth of 60 GHz frequency band. On the other hand, metaverse type of applications, such as augmented reality (AR) and virtual reality (VR) applications and the like, typically require a high data rate with low latency. To meet the high data rate and low latency requirements for emerging metaverse type of applications, the 60 GHz millimeter wave (mmWave) band has been considered as one of potential technologies for next-generation wireless connectivity. In that regard, design options of channel bandwidth, scalable waveform and numerologies to simplify implementations and enable reuse of most legacy IEEE 802.11ac/ax/be system designs (e.g., tone plans, modulation and coding scheme (MCS) and so on) remain to be defined at the present time. Therefore, there is a need for a solution of scalable waveform and numerology designs for next-generation WLANs in the 60 GHz frequency band.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to scalable waveform and numerology designs for next-generation WLANs in the 60 GHz frequency band.

In one aspect, a method may involve a processor of a first apparatus communicating in a 60 GHz frequency band wirelessly with a second apparatus by either or both: (a) transmitting first data or first information to the second apparatus; and (b) receiving second data or second information from the second apparatus. In communicating in the 60 GHz frequency band wirelessly, the method may involve the processor communicating in the 60 GHz frequency band wirelessly based on a scalable waveform and numerology design with at least one of: (i) selection of a specific subcarrier spacing (SCS); (ii) selection of a specific guard interval (GI) design; and (iii) reuse of a preexisting channelization or tone plan.

In another aspect, an apparatus may include a transceiver configured to communicate wirelessly and a processor coupled to the transceiver. The processor may communicate, via the transceiver, in a 60 GHz frequency band wirelessly with one other apparatus by either or both: (a) transmitting first data or first information to the other apparatus; and (b) receiving second data or second information from the other apparatus. In communicating in the 60 GHz frequency band wirelessly, the processor may communicate in the 60 GHz frequency band wirelessly based on a scalable waveform and numerology design with at least one of: (i) selection of a specific SCS; (ii) selection of a specific GI design; and (iii) reuse of a preexisting channelization or tone plan.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design under a proposed scheme in accordance with the present disclosure.

FIG. 4 is a diagram of an example design under a proposed scheme in accordance with the present disclosure.

FIG. 5 is a diagram of an example design under a proposed scheme in accordance with the present disclosure.

FIG. 6 is a diagram of an example design under a proposed scheme in accordance with the present disclosure.

FIG. 7 is a diagram of an example design under a proposed scheme in accordance with the present disclosure.

FIG. 8 is a diagram of an example design under a proposed scheme in accordance with the present disclosure.

FIG. 11 is a diagram of an example design under a proposed scheme in accordance with the present disclosure.

FIG. 13 is a diagram of an example design under a proposed scheme in accordance with the present disclosure.

FIG. 14 is a diagram of an example design under a proposed scheme in accordance with the present disclosure.

FIG. 16 is a diagram of an example design under a proposed scheme in accordance with the present disclosure.

FIG. 17 is a diagram of an example design under a proposed scheme in accordance with the present disclosure.

FIG. 19 is a diagram of an example design under a proposed scheme in accordance with the present disclosure.

FIG. 20 is a diagram of an example design under a proposed scheme in accordance with the present disclosure.

FIG. 22 is a flowchart of an example process in accordance with an implementation of the present disclosure.

DETAILED DESCRIPTION OF PREFERRED EMBODIMENTS

Figure 1:
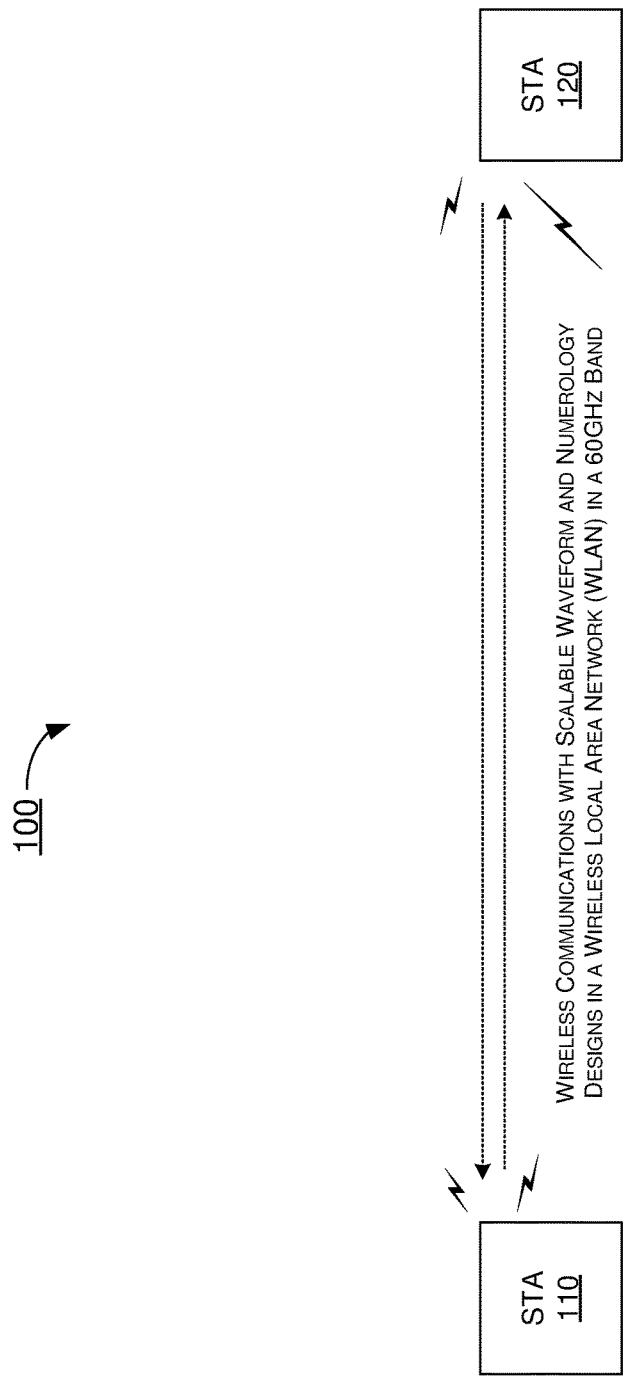
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

OVERVIEW

Implementations in accordance with the present disclosure relate to various techniques, methods, schemes and/or solutions pertaining to scalable waveform and numerology designs for next-generation WLANs in the 60 GHz frequency band. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 500 MHz may be interchangeably denoted as BW500 or BW500M, a bandwidth of 520 MHz may be interchangeably denoted as BW520 or BW520M, a bandwidth of 540 MHz may be interchangeably denoted as BW540 or BW540M, a bandwidth of 640 MHz may be interchangeably denoted as BW640 or BW640M, a bandwidth of 960 MHz may be interchangeably denoted as BW960 or BW960M, a bandwidth of 1000 MHz may be interchangeably denoted as BW1000 or BW1000M, a bandwidth of 1280 MHz may be interchangeably denoted as BW1280 or BW1280M, a bandwidth of 1600 MHz may be interchangeably denoted as BW1600 or BW1600M, a bandwidth of 1920 MHz may be interchangeably denoted as BW1920 or BW1920M, a bandwidth of 2560 MHz may be interchangeably denoted as BW2560 or BW2560M, a bandwidth of 3840 MHz may be interchangeably denoted as BW3840 or BW3840M, a bandwidth of 5120 MHz may be interchangeably denoted as BW5120 or BW5120M, a bandwidth of 5760 MHz may be interchangeably denoted as BW5760 or BW5760M, a bandwidth of 6000 MHz may be interchangeably denoted as BW6000 or BW6000M, a bandwidth of 6240 MHz may be interchangeably denoted as BW6240 or BW6240M, a bandwidth of 6480 MHz may be interchangeably denoted as BW6480 or BW6480M.

FIG. 1 illustrates an example network environment 100 in which various solutions and schemes in accordance with the present disclosure may be implemented. FIG. 2~FIG. 22 illustrate examples of implementation of various proposed schemes in network environment 100 in accordance with the present disclosure. The following description of various proposed schemes is provided with reference to FIG. 1~FIG. 22.

Referring to FIG. 1, network environment 100 may involve at least a station (STA) 110 communicating wirelessly with a STA 120. Each of STA 110 and STA 120 may be a non-access point (non-AP) STA or, alternatively, either of STA 110 and STA 120 may function as an access point (AP) STA. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the scalable waveform and numerology designs for next-generation WLANs in the 60 GHz frequency band in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

In an IEEE 802.11be extremely-high-throughput (EHT) system, certain bandwidths (BWs) and SCSs are supported. The supported BWs include 20 MHz, 40 MHz, 80 MHz, 160 MHz and 320 MHz, and supported frequency bands include the 2.4 GHz band, 5 GHz band and 6 GHz band. The supported subcarrier spacings include 312.5 kHz for 1× EHT-long training field (EHT-LTF) mode, 156.25 kHz for 2× EHT-LFT mode, and 78.125 kHz for 4× EHT-LTF mode. Non-EHT modulated portion may use SCS=312.5 kHz, and EHT data portion may use SCS=78.125 kHz. Moreover, RUs of different sizes may be utilized. For instance, small-size RUs may include RU26, RU52 and RU106; large-size RUs may include RU242, RU484, RU996, RU2×996 and RU4×996; small-size MRUs may include MRU(26+52) and MUR(26+106); and large-size MRUs may include MRU (242+484), MRU(484+996), MRU(242+484+996), MRU (484+2×996), MRU(3×996) and MRU(484+3×996).

In the various designs described below and depicted in FIG. 2~FIG. 20, for each channel bandwidth under each design, pertinent parameters may include, for example and without limitation, $\Delta F$ (subcarrier frequency spacing), $T_{dft}$ (IDFT/DFT period), $T_{gi}$ (GI duration), $T_{sym}$ (OFDM symbol duration), $F_s$ (sampling frequency), $N_{fft}$ (number of FFT subcarriers), $N_{sd}$ (number of data-carrying subcarriers), $N_{sp}$ (number of pilot-tone subcarriers), $N_{dc}$ (number of direct-current tones), $N_{st}$ (total number of subcarriers), $N_{guard}$ (number of guard tones), and tone plan.

Under various proposed schemes in accordance with the present disclosure, to render next-generation 60 GHz designs more flexible, their implementations more user-friendly, and legacy physical-layer (PHY) designs reusable as much as possible, certain general design criteria are considered. For instance, a fast Fourier transform (FFT) size of less than or equal to 4096 (e.g., 64, 128, 256, 512, 1024, 2048, 4096) may be utilized. Also, existing IEEE 802.11ac/ax/be tone plans may be reused. Additionally, large RUs/MRUs (but not small RUs/MRUs) may be supported for resource allocation. Moreover, BW may be either a multiple of 320 MHz or a multiple of 640 MHz (e.g., BW=n*320 MHz or BW=n*640 MHz, with n being a positive integer such that n=1, 2, 3, 4, and so on). Furthermore, SCS=n*78.125 kHz or n*312.5 kHz or $2^{\hat{}}\mu$*78.125 kHz or $2^{\hat{}}\mu$*312.5 kHz, with n and μ being positive integers. Also, three types of guard intervals (GIs) may be considered, including: short GI, normal GI and long GI.

Under the proposed schemes, to cope with a higher phase noise for the 60 GHz frequency band and enable a FFT size ≤4096 for a wide BW, certain SCSs may be considered for different design options. For instance, SCS=625 kHz, 1250 kHz, 2500 kHz, 5000 kHz, corresponding to SC=312.5 kHz*$2^{\hat{}}\mu$, with μ=1, 2, 3, 4. Alternatively, SCS=[625, 937.5, 1250, 1562.5, 1875, 2187.5, 2500, 2812.5, 3125, 3437.5, 4375, 4687.5, 5000] kHz, corresponding to SCS=312.5*n, with n=2, 3, 4, 5, . . . , 16. Still alternatively, SCS=78.125 kHz*n, with n being a positive integer. For GI, different lengths of GI may be utilized for different application scenarios. For instance, GI=$T_{dft}$/64, $T_{dft}$/32, $T_{dft}$/16, $T_{dft}$/8, $T_{dft}$/4, and so forth, depending on the SCS in use. Here, $T_{dft}$=1e6/SCS, with SCS in unites of kHz and $T_{dft}$ in units of nanoseconds (ns)).

Figure 3:
FIG. 3 is a diagram of an example design under a proposed scheme in accordance with the present disclosure.
Figure 9:
FIG. 9 is a diagram of an example design under a proposed scheme in accordance with the present disclosure.

FIG. 2 illustrates an example design 200 for different BWs under a proposed scheme in accordance with the present disclosure. In design 200, GI values may be changed to other values. FIG. 3 illustrates an example design 300 for BW320M under a proposed scheme in accordance with the present disclosure. In design 300, GI values may be changed to other values. Moreover, in design 300, SCS=312.5 kHz*$2^{\hat{}}\mu$, with μ=1, 2, 3, 4. FIG. 4 illustrates an example design 400 for BW640M under a proposed scheme in accordance with the present disclosure. In design 400, GI values may be changed to other values. Moreover, in design 400, SCS=312.5 kHz*$2^{\hat{}}\mu$, with μ=1, 2, 3, 4. FIG. 5 illustrates an example design 500 for BW1280M under a proposed scheme in accordance with the present disclosure. In design 500, GI values may be changed to other values. Moreover, in design 500, SCS=312.5 kHz*$2^{\hat{}}\mu$, with μ=1, 2, 3, 4. FIG. 6 illustrates an example design 600 for BW960M under a proposed scheme in accordance with the present disclosure. In design 600, GI values may be changed to other values. Moreover, in design 600, SCS=n*312.5 kHz, with n=3, 6, 12. FIG. 7 illustrates an example design 700 for BW1600M under a proposed scheme in accordance with the present disclosure. In design 700, GI values may be changed to other values. Moreover, in design 700, SCS=n*78.125 kHz, with n=10, 20, 40. FIG. 8 illustrates an example design 800 for BW1920M under a proposed scheme in accordance with the present disclosure. In design 800, GI values may be changed to other values. Moreover, in design 800, SCS=n*312.5 kHz, with n=3, 6, 12. FIG. 9 illustrates an example design 900 for BW3840M under a proposed scheme in accordance with the present disclosure. In design 900, GI values may be changed to other values. Moreover, in design 900, SCS=n*312.5 kHz, with n=3, 6, 12.

Figure 10:
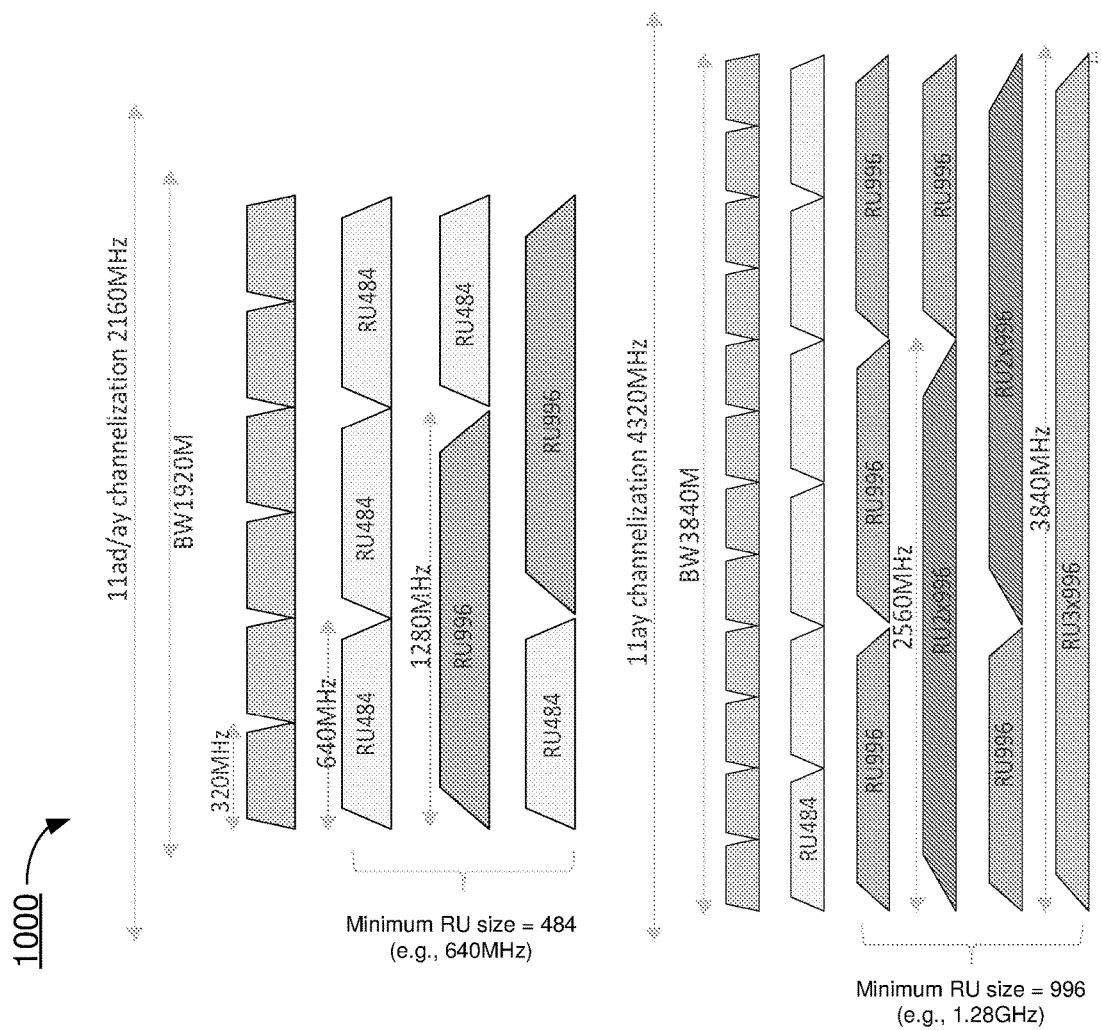
FIG. 10 is a diagram of an example design under a proposed scheme in accordance with the present disclosure.
Figure 12:
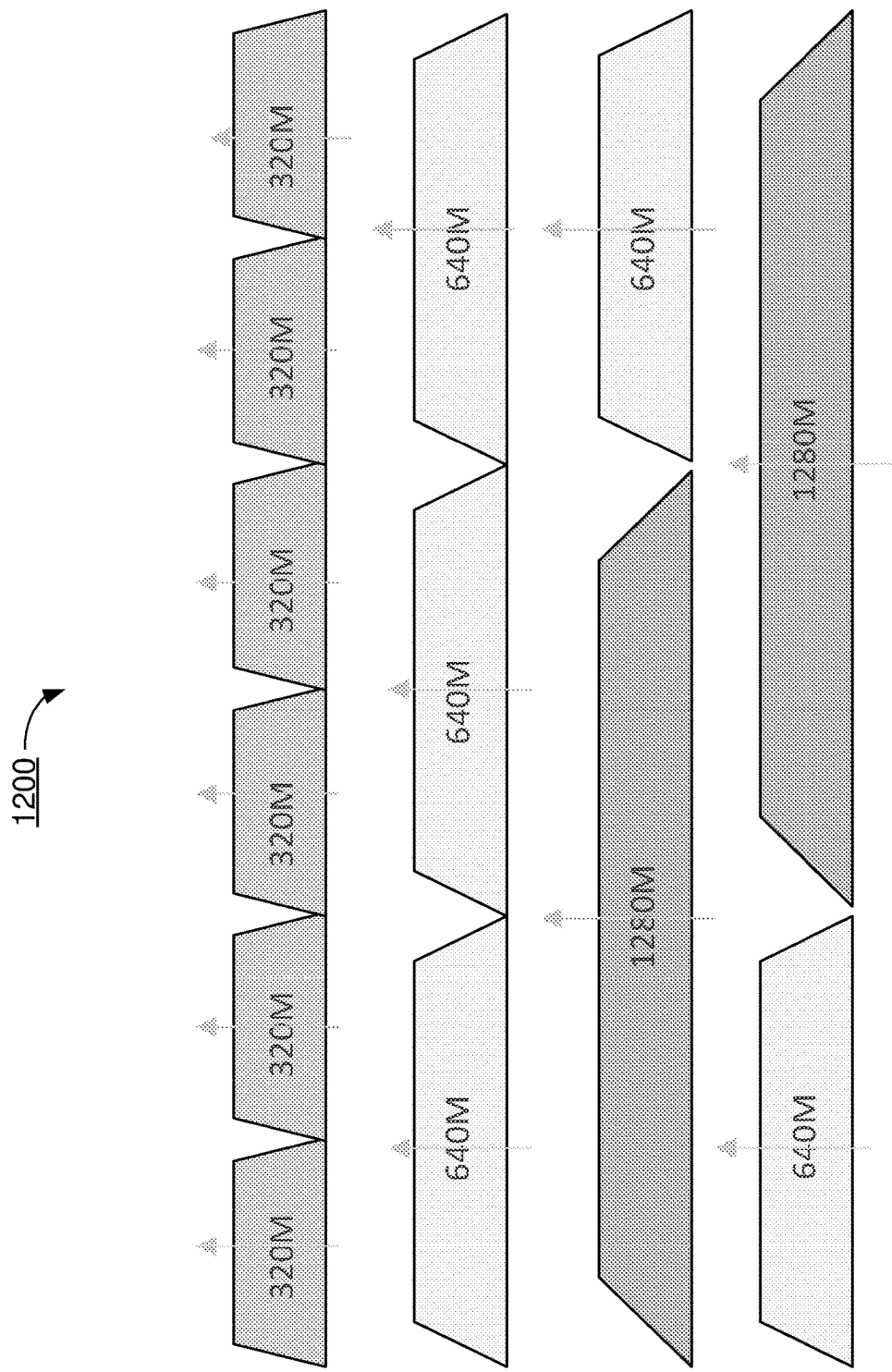
FIG. 12 is a diagram of an example design under a proposed scheme in accordance with the present disclosure.

FIG. 10 illustrates an example design 1000 for BW1920M and BW3840M under a proposed scheme in accordance with the present disclosure. In design 1000, BW1920M=BW320M*6 and BW3840M=BW320M* 2. Additionally, $F_{SCS}$=$2^{\hat{}}4$*78.125 kHz=1250 kHz. Moreover, GI may be 25 ns (short), 50 ns (normal) or 100 ns (long). IEEE 802.11be tone plans may be reused in design 1000. FIG. 11 illustrates another example design 1100 for BW1920M and BW3840M under a proposed scheme in accordance with the present disclosure. In design 1100, BW1920M=BW320M*6 and BW3840M=BW320M*12. Additionally, $F_{SCS}$=$2^{\hat{}}5$*78.125 kHz=2500 kHz. Moreover, GI may be 25 ns (short), 50 ns (normal) or 100 ns (long). IEEE 802.11be tone plans may be reused in design 1100. FIG. 12 illustrates an example design 1200 of options for BW1920M, BW2560M and BW3840M under a proposed scheme in accordance with the present disclosure. In design 1200, for large BWs such as BW1920M, BW2560M, BW3840M and larger BWs, another alternative way to achieve the same effective channel bandwidth may be split into several spectrum segments. For instance, 1920 MHz may be split into 1280 MHz+640 MHz, and 2560 MHz may be split into 1280 MHz+1280 MHz.

Figure 15:
FIG. 15 is a diagram of an example design under a proposed scheme in accordance with the present disclosure.

FIG. 13 illustrates an example design 1300 for BW540M and BW480M under a proposed scheme in accordance with the present disclosure. In design 1300, GI values may be changed to other values. FIG. 14 illustrates an example design 1400 for BW520M, BW500M and BW1000M under a proposed scheme in accordance with the present disclosure. In design 1400, GI values may be changed to other values. FIG. 15 illustrates an example design 1500 for BW5760M under a proposed scheme in accordance with the present disclosure. In design 1500, GI values may be changed to other values. FIG. 16 illustrates an example design 1600 for BW6000M, BW6240M and BW6480M under a proposed scheme in accordance with the present disclosure. In design 1600, GI values may be changed to other values.

Under a proposed scheme in accordance with the present disclosure with respect to RU and MRU support for next-generation Wi-Fi in the 60 GHz frequency band, for a BW with a corresponding tone plan greater than or equal to that of IEEE 802.11be BW40M, large RUs and MRUs may be supported for orthogonal frequency-division multiple access (OFDMA) operations in next-generation Wi-Fi in the 60 GHz band. For instance, in case that a corresponding tone plan is equivalent to that of IEEE 802.11be BW40M, then two RU242s may be supported for OFDMA resource allocation. In case that a corresponding tone plan is equivalent to that of IEEE 802.11be BW80M, then four RU242s, two RU484s and MRU(242+484) may be supported for OFDMA resource allocation. In case that a corresponding tone plan is equivalent to that of IEEE 802.11be BW160M, then eight RU242s, four RU484s, two RU996s, MRU(484+996) and so on may be supported for OFDMA resource allocation. In case that a corresponding tone plan is equivalent to that of IEEE 802.11be BW320M, then sixteen RU242s, eight RU484s, four RU996s, two RU(2×996)s, MRU(484+996), MRU(484+2×996, MRU(3×996), MRU(484+3×996) and so on may be supported for OFDMA resource allocation.

Figure 18:
FIG. 18 is a diagram of an example design under a proposed scheme in accordance with the present disclosure.

FIG. 17 illustrates an example design 1700 of a scalable numerology design for BW1280M under a proposed scheme in accordance with the present disclosure. FIG. 18 illustrates an example design 1800 of a scalable numerology design for BW2560M under a proposed scheme in accordance with the present disclosure. FIG. 19 illustrates an example design 1900 of a scalable numerology design for BW5120M under a proposed scheme in accordance with the present disclosure. FIG. 20 illustrates an example design 2000 of a scalable numerology design for BW160M under a proposed scheme in accordance with the present disclosure.

ILLUSTRATIVE IMPLEMENTATIONS

Figure 21:
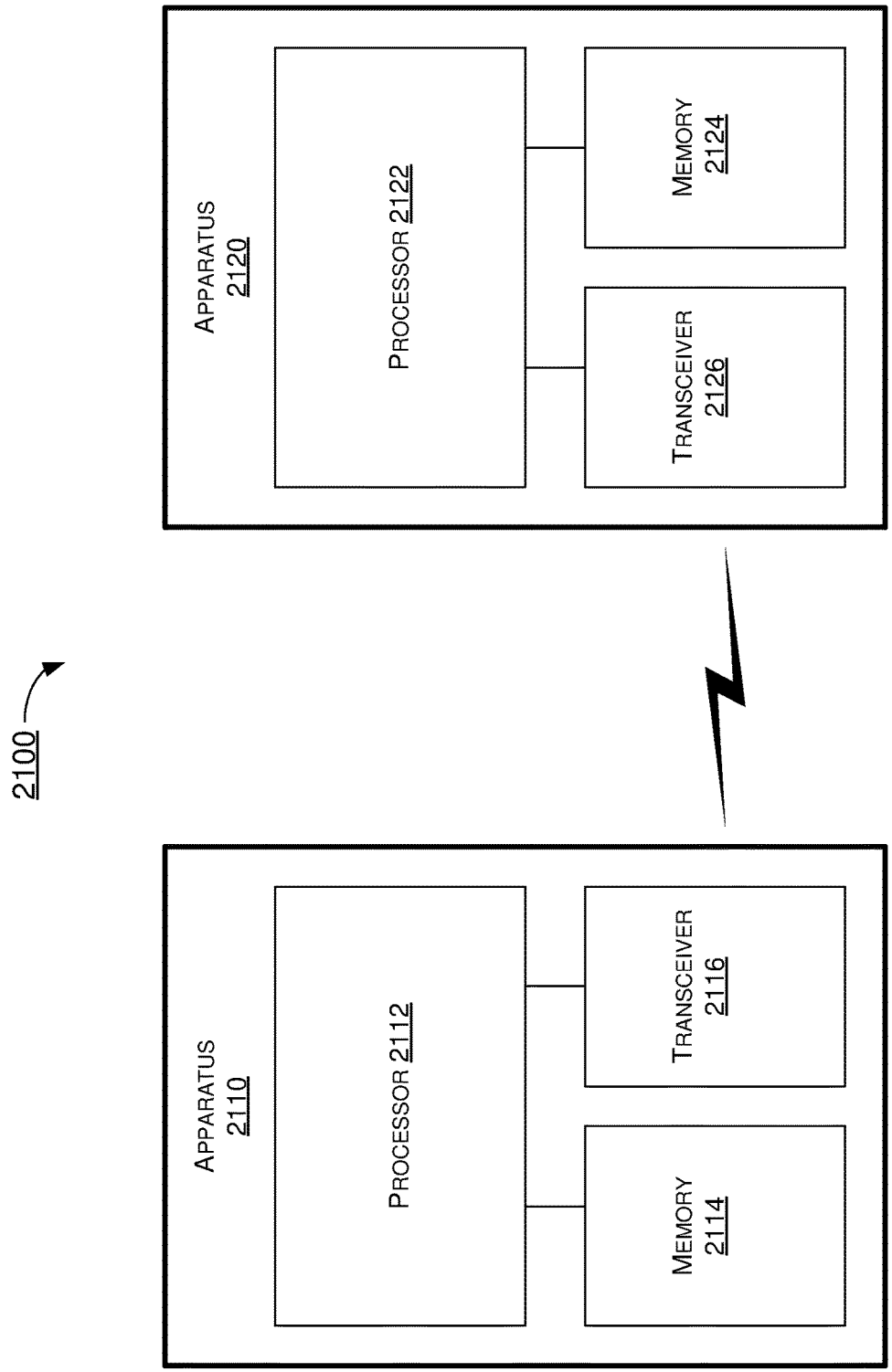
FIG. 21 is a block diagram of an example communication system in accordance with an implementation of the present disclosure.

FIG. 21 illustrates an example system 2100 having at least an example apparatus 2110 and an example apparatus 2120 in accordance with an implementation of the present disclosure. Each of apparatus 2110 and apparatus 2120 may perform various functions to implement schemes, techniques, processes and methods described herein pertaining to scalable waveform and numerology designs for next-generation WLANs in the 60 GHz frequency band, including the various schemes described above with respect to various proposed designs, concepts, schemes, systems and methods described above as well as processes described below. For instance, apparatus 2110 may be implemented in STA 110 and apparatus 2120 may be implemented in STA 120, or vice versa.

Each of apparatus 2110 and apparatus 2120 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 2110 and apparatus 2120 may be implemented in a smartphone, a smart watch, a personal digital assistant, a digital camera, or a computing equipment such as a tablet computer, a laptop computer or a notebook computer. Each of apparatus 2110 and apparatus 2120 may also be a part of a machine type apparatus, which may be an IoT apparatus such as an immobile or a stationary apparatus, a home apparatus, a wire communication apparatus or a computing apparatus. For instance, each of apparatus 2110 and apparatus 2120 may be implemented in a smart thermostat, a smart fridge, a smart door lock, a wireless speaker or a home control center. When implemented in or as a network apparatus, apparatus 2110 and/or apparatus 2120 may be implemented in a network node, such as an AP in a WLAN.

In some implementations, each of apparatus 2110 and apparatus 2120 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 2110 and apparatus 2120 may be implemented in or as a STA or an AP. Each of apparatus 2110 and apparatus 2120 may include at least some of those components shown in FIG. 21 such as a processor 2112 and a processor 2122, respectively, for example. Each of apparatus 2110 and apparatus 2120 may further include one or more other components not pertinent to the proposed scheme of the present disclosure (e.g., internal power supply, display device and/or user interface device), and, thus, such component(s) of apparatus 2110 and apparatus 2120 are neither shown in FIG. 21 nor described below in the interest of simplicity and brevity.

In one aspect, each of processor 2112 and processor 2122 may be implemented in the form of one or more single-core processors, one or more multi-core processors, one or more RISC processors or one or more CISC processors. That is, even though a singular term "a processor" is used herein to refer to processor 2112 and processor 2122, each of processor 2112 and processor 2122 may include multiple processors in some implementations and a single processor in other implementations in accordance with the present disclosure. In another aspect, each of processor 2112 and processor 2122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2112 and processor 2122 is a special-purpose machine specifically designed, arranged and configured to perform specific tasks including those pertaining to scalable waveform and numerology designs for next-generation WLANs in the 60 GHz frequency band in accordance with various implementations of the present disclosure.

In some implementations, apparatus 2110 may also include a transceiver 2116 coupled to processor 2112. Transceiver 2116 may include a transmitter capable of wirelessly transmitting and a receiver capable of wirelessly receiving data. In some implementations, apparatus 2120 may also include a transceiver 2126 coupled to processor 2122. Transceiver 2126 may include a transmitter capable of wirelessly transmitting and a receiver capable of wirelessly receiving data. It is noteworthy that, although transceiver 2116 and transceiver 2126 are illustrated as being external to and separate from processor 2112 and processor 2122, respectively, in some implementations, transceiver 2116 may be an integral part of processor 2112 as a system on chip (SoC), and transceiver 2126 may be an integral part of processor 2122 as a SoC.

In some implementations, apparatus 2110 may further include a memory 2114 coupled to processor 2112 and capable of being accessed by processor 2112 and storing data therein. In some implementations, apparatus 2120 may further include a memory 2124 coupled to processor 2122 and capable of being accessed by processor 2122 and storing data therein. Each of memory 2114 and memory 2124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2114 and memory 2124 may include a type of read-only memory (ROM) such as mask ROM, programmable ROM (PROM), erasable programmable ROM (EPROM) and/or electrically erasable programmable ROM (EEPROM). Alternatively, or additionally, each of memory 2114 and memory 2124 may include a type of non-volatile random-access memory (NVRAM) such as flash memory, solid-state memory, ferroelectric RAM (FeRAM), magnetoresistive RAM (MRAM) and/or phase-change memory.

Each of apparatus 2110 and apparatus 2120 may be a communication entity capable of communicating with each other using various proposed schemes in accordance with the present disclosure. For illustrative purposes and without limitation, a description of capabilities of apparatus 2110, as STA 110, and apparatus 2120, as STA 120, is provided below. It is noteworthy that, although a detailed description of capabilities, functionalities and/or technical features of apparatus 2120 is provided below, the same may be applied to apparatus 2110 although a detailed description thereof is not provided solely in the interest of brevity. It is also noteworthy that, although the example implementations described below are provided in the context of WLAN, the same may be implemented in other types of networks.

Under various proposed schemes pertaining to scalable waveform and numerology designs for next-generation WLANs in the 60 GHz frequency band in accordance with the present disclosure, with apparatus 2110 implemented in or as STA 110 and apparatus 2120 implemented in or as STA 120 in network environment 100, processor 2112 of apparatus 2110 may communicate, via transceiver 2116, in a 60 GHz frequency band wirelessly with apparatus 2120 by either or both: (a) transmitting first data or first information to the second apparatus; and (b) receiving second data or second information from the second apparatus. In communicating in the 60 GHz frequency band wirelessly, processor 2112 may communicate in the 60 GHz frequency band wirelessly based on a scalable waveform and numerology design with at least one of: (i) selection of a specific SCS; (ii) selection of a specific GI design; and (iii) reuse of a preexisting channelization or tone plan.

In some implementations, the selection of the specific SCS may involve selection of the SCS to support an FFT size of less than or equal to 4096. For instance, the SCS may be selected from [625 kHz, 1250 kHz, 2500 kHz, 5000 kHz]. Alternatively, the SCS may be selected from [625 kHz, 937.5 kHz, 1250 kHz, 1562.5 kHz, 2187.5k Hz, 2500 kHz, 2812.5 kHz, 3125 kHz, 3437.5 kHz, 4375 kHz, 4687.5 kHz, 5000 kHz]. Alternatively, the SCS may be 312.5 kHz*n , or 78.125 kHz*n, n being a positive integer.

In some implementations, the selection of the specific GI design may involve selection of a GI with a GI duration $(T_{gi})=T_{dft}/64$, $T_{dft}/32$, $T_{dft}/16$, $T_{dft}/8$ or $T_{dft}/4$, with $T_{dft}$ denoting an OFDM symbol duration.

In some implementations, the reuse of the preexisting channelization or tone plan may involve reuse of an IEEE 802.11ac, IEEE 802.11ax or IEEE 802.11be tone plan.

In some implementations, in communicating, processor 2112 may communicate in a 160 MHz channel bandwidth. Moreover, the SCS may be 0.625 MHz, the GI may be selected with a short GI duration of 50 ns or 25 ns, a normal GI duration of 100 ns or 50 ns, or a long GI duration of 200 ns or 100 ns, and the tone plan may be an IEEE 802.11be tone plan corresponding to 20 MHz for a 242-tone resource unit (RU242) or an IEEE 802.11ac tone plan corresponding to 80 MHz. Alternatively, the SCS may be 1.25 MHz, the GI may be selected with a short GI duration of 25 ns, a normal GI duration of 50 ns, or a long GI duration of 100 ns, and the tone plan may be an IEEE 802.11ac tone plan corresponding to 40 MHz. Alternatively, the SCS may be 2.5 MHz , the GI may be selected with a short GI duration of 25 ns, a normal GI duration of 50 ns, or a long GI duration of 100 ns, and the tone plan may be the IEEE 802.11ac tone plan corresponding to 40 MHz.

In some implementations, in communicating, processor 2112 may communicate in a 320 MHz channel bandwidth. Moreover, the SCS may be 1.25 MHz, the GI may be selected with a short GI duration of 25 ns, a normal GI duration of 50 ns, or a long GI duration of 100 ns, and the tone plan may be an IEEE 802.11be tone plan corresponding to 40 MHz for a 242-tone resource unit (RU242) or an IEEE 802.11ac tone plan corresponding to 80 MHz. Alternatively, the SCS may be 2.5 MHz , the GI may be selected with a short GI duration of 25 ns, a normal GI duration of 50 ns, or a long GI duration of 100 ns, and the tone plan may be the IEEE 802.11ac tone plan corresponding to 40 MHz. Alternatively, the SCS may be 5 MHz, the GI may be selected with a short GI duration of 12.5 ns, 18.75 ns or 25 ns, a normal GI duration of 25 ns, 37.5 ns or 50 ns, or a long GI duration of 50 ns, 75 ns or 100 ns, and the tone plan may be the IEEE 802.11ac tone plan corresponding to 20 MHz.

In some implementations, in communicating, processor 2112 may communicate in a 480 MHz channel bandwidth. Moreover, the SCS may be 1.875 MHz, the GI may be selected with a short GI duration of 33.333 ns, a normal GI duration of 66.667 ns, or a long GI duration of 133.333 ns, and the tone plan may be an IEEE 802.11be tone plan corresponding to 20 MHz for a 242-tone resource unit (RU242) or an IEEE 802.11ac tone plan corresponding to 80 MHz. Alternatively, the SCS may be 3.75 MHz, the GI may be selected with a short GI duration of 16.667 ns, a normal GI duration of 33.333 ns, or a long GI duration of 66.667 ns, and the tone plan may be the IEEE 802.11ac tone plan corresponding to 40 MHz.

In some implementations, in communicating, processor 2112 may communicate in a 640 MHz channel bandwidth. Moreover, the SCS may be 1.25 MHz, the GI may be selected with a short GI duration of 25 ns, a normal GI duration of 50 ns, or a long GI duration of 100 ns, and the tone plan may be an IEEE 802.11be tone plan corresponding to 40 MHz for a 484-tone resource unit (RU484) or an IEEE 802.11ac tone plan corresponding to 160 MHz. Alternatively, the SCS may be 2.5 MHz , the GI may be selected with a short GI duration of 25 ns, a normal GI duration of 50 ns, or a long GI duration of 100 ns, and the tone plan may be the IEEE 802.11be tone plan corresponding to 20 MHz for a 242-tone resource unit (RU242) or the IEEE 802.11ac tone plan corresponding to 80 MHz. Alternatively, the SCS may be 5 MHz, the GI may be selected with a short GI duration of 12.5 ns, 18.75 ns or 25 ns, a normal GI duration of 25 ns, 37.5 ns or 50 ns, or a long GI duration of 50 ns, 75 ns or 100 ns, and the tone plan may be the IEEE 802.11ac tone plan corresponding to 40 MHz.

In some implementations, in communicating, processor 2112 may communicate in a 960 MHz channel bandwidth. Moreover, the SCS may be 1.875 MHz, the GI may be selected with a short GI duration of 16.667 ns, a normal GI duration of 33.333 ns, or a long GI duration of 66.667 ns, and the tone plan may be an IEEE 802.11be tone plan corresponding to 40 MHz for a 484-tone resource unit (RU484) or an IEEE 802.11ac tone plan corresponding to 160 MHz. Alternatively, the SCS may be 3.75 MHz, the GI may be selected with a short GI duration of 16.667 ns, a normal GI duration of 33.333 ns, or a long GI duration of 66.667 ns, and the tone plan may be the IEEE 802.11be tone plan corresponding to 20 MHz for a 242-tone resource unit (RU242) or the IEEE 802.11ac tone plan corresponding to 80 MHz.

In some implementations, in communicating, processor 2112 may communicate in a 1280 MHz channel bandwidth. Moreover, the SCS may be 1.25 MHz, the GI may be selected with a short GI duration of 25 ns, a normal GI duration of 50 ns, or a long GI duration of 100 ns, and the tone plan may be an IEEE 802.11be tone plan corresponding to 80 MHz for a 996-tone resource unit (RU996). Alternatively, the SCS may be 2.5 MHz , the GI may be selected with a short GI duration of 25 ns, a normal GI duration of 50 ns, or a long GI duration of 100 ns, and the tone plan may be the IEEE 802.11be tone plan corresponding to 40 MHz for a 484-tone resource unit (RU484) or the IEEE 802.11ac tone plan corresponding to 160 MHz. Alternatively, the SCS may be 5 MHz, the GI may be selected with a short GI duration of 12.5 ns, 18.75 ns or 25 ns, a normal GI duration of 25 ns, 37.5 ns or 50 ns, or a long GI duration of 50 ns, 75 ns or 100 ns, and the tone plan may be the IEEE 802.11be tone plan corresponding to 20 MHz for RU242 or the IEEE 802.11ac tone plan corresponding to 80 MHz.

In some implementations, in communicating, processor 2112 may communicate in a 2560 MHz channel bandwidth. Moreover, the SCS may be 1.25 MHz, the GI may be selected with a short GI duration of 25 ns, a normal GI duration of 50 ns, or a long GI duration of 100 ns, and the tone plan may be an IEEE 802.11be tone plan corresponding to 160 MHz for two 996-tone resource units (RU2×996). Alternatively, the SCS may be 2.5 MHz , the GI may be selected with a short GI duration of 25 ns, a normal GI duration of 50 ns, or a long GI duration of 100 ns, and the tone plan may be the IEEE 802.11be tone plan corresponding to 80 MHz for a 996-tone resource unit (RU996). Alternatively, the SCS may be 5 MHz, the GI may be selected with a short GI duration of 12.5 ns, a normal GI duration of 25 ns, or a long GI duration of 50 ns, and the tone plan may be the IEEE 802.11be tone plan corresponding to 40 MHz for a 484-tone resource unit (RU484) or the IEEE 802.11ac tone plan corresponding to 160 MHz.

ILLUSTRATIVE PROCESSES

FIG. 22 illustrates an example process 2200 in accordance with an implementation of the present disclosure. Process 2200 may represent an aspect of implementing various proposed designs, concepts, schemes, systems and methods described above. More specifically, process 2200 may represent an aspect of the proposed concepts and schemes pertaining to scalable waveform and numerology designs for next-generation WLANs in the 60 GHz frequency band in accordance with the present disclosure. Process 2200 may include one or more operations, actions, or functions as illustrated by one or more of blocks 2210 as well as sub-blocks 2212 and 2214. Although illustrated as discrete blocks, various blocks of process 2200 may be divided into additional blocks, combined into fewer blocks, or eliminated, depending on the desired implementation. Moreover, the blocks/sub-blocks of process 2200 may be executed in the order shown in FIG. 22 or, alternatively in a different order. Furthermore, one or more of the blocks/sub-blocks of process 2200 may be executed repeatedly or iteratively.

Process 2200 may be implemented by or in apparatus 2110 and apparatus 2120 as well as any variations thereof. Solely for illustrative purposes and without limiting the scope, process 2200 is described below in the context of apparatus 2110 implemented in or as STA 110 functioning as a non-AP STA and apparatus 2120 implemented in or as STA 120 functioning as an AP STA of a wireless network such as a WLAN in network environment 100 in accordance with one or more of IEEE 802.11 standards. Process 2200 may begin at block 2210.

At 2210, process 2200 may involve processor 2112 of apparatus 2110 communicating, via transceiver 2116, in a 60 GHz frequency band wirelessly with apparatus 2120 by either or both: (a) transmitting first data or first information to the second apparatus; and (b) receiving second data or second information from the second apparatus. In communicating in the 60 GHz frequency band wirelessly, process 2200 may involve processor 2112 communicating in the 60 GHz frequency band wirelessly based on a scalable waveform and numerology design with at least one of: (i) selection of a specific SCS; (ii) selection of a specific GI design; and (iii) reuse of a preexisting channelization or tone plan.

In some implementations, the selection of the specific SCS may involve selection of the SCS to support an FFT size of less than or equal to 4096. For instance, the SCS may be selected from [625 kHz, 1250 kHz, 2500 kHz, 5000 kHz]. Alternatively, the SCS may be selected from [625 kHz, 937.5 kHz, 1250 kHz, 1562.5 kHz, 2187.5 kHz, 2500 kHz, 2812.5 kHz, 3125 kHz, 3437.5 kHz, 4375 kHz, 4687.5 kHz, 5000 kHz]. Alternatively, the SCS may be 312.5 kHz*n , or 78.125 kHz*n, n being a positive integer.

In some implementations, the selection of the specific GI design may involve selection of a GI with a GI duration $(T_{gi}) = T_{dft}/64$, $T_{dft}/32$, $T_{dft}/16$, $T_{dft}/8$ or $T_{dft}/4$, with $T_{dft}$ denoting an OFDM symbol duration.

In some implementations, the reuse of the preexisting channelization or tone plan may involve reuse of an IEEE 802.11ac, IEEE 802.11ax or IEEE 802.11be tone plan.

In some implementations, in communicating, process 2200 may involve processor 2112 communicating in a 160 MHz channel bandwidth. Moreover, the SCS may be 0.625 MHz, the GI may be selected with a short GI duration of 50 ns or 25 ns, a normal GI duration of 100 ns or 50 ns, or a long GI duration of 200 ns or 100 ns, and the tone plan may be an IEEE 802.11be tone plan corresponding to 20 MHz for a 242-tone resource unit (RU242) or an IEEE 802.11ac tone plan corresponding to 80 MHz. Alternatively, the SCS may be 1.25 MHz, the GI may be selected with a short GI duration of 25 ns, a normal GI duration of 50 ns, or a long GI duration of 100 ns, and the tone plan may be an IEEE 802.11ac tone plan corresponding to 40 MHz. Alternatively, the SCS may be 2.5 MHz , the GI may be selected with a short GI duration of 25 ns, a normal GI duration of 50 ns, or a long GI duration of 100 ns, and the tone plan may be the IEEE 802.11ac tone plan corresponding to 40 MHz.

In some implementations, in communicating, process 2200 may involve processor 2112 communicating in a 320 MHz channel bandwidth. Moreover, the SCS may be 1.25 MHz, the GI may be selected with a short GI duration of 25 ns, a normal GI duration of 50 ns, or a long GI duration of 100 ns, and the tone plan may be an IEEE 802.11be tone plan corresponding to 40 MHz for a 242-tone resource unit (RU242) or an IEEE 802.11ac tone plan corresponding to 80 MHz. Alternatively, the SCS may be 2.5 MHz , the GI may be selected with a short GI duration of 25 ns, a normal GI duration of 50 ns, or a long GI duration of 100 ns, and the tone plan may be the IEEE 802.11ac tone plan corresponding to 40 MHz. Alternatively, the SCS may be 5 MHz, the GI may be selected with a short GI duration of 12.5 ns, 18.75ns or 25 ns, a normal GI duration of 25 ns, 37.5 ns or 50 ns, or a long GI duration of 50 ns, 75ns or 100 ns, and the tone plan may be the IEEE 802.11ac tone plan corresponding to 20 MHz.

In some implementations, in communicating, process 2200 may involve processor 2112 communicating in a 480 MHz channel bandwidth. Moreover, the SCS may be 1.875 MHz, the GI may be selected with a short GI duration of 33.333 ns, a normal GI duration of 66.667 ns, or a long GI duration of 133.333ns, and the tone plan may be an IEEE 802.11be tone plan corresponding to 20 MHz for a 242-tone resource unit (RU242) or an IEEE 802.11ac tone plan corresponding to 80 MHz. Alternatively, the SCS may be 3.75 MHz, the GI may be selected with a short GI duration of 16.667 ns, a normal GI duration of 33.333 ns, or a long GI duration of 66.667 ns, and the tone plan may be the IEEE 802.11ac tone plan corresponding to 40 MHz.

In some implementations, in communicating, process 2200 may involve processor 2112 communicating in a 640 MHz channel bandwidth. Moreover, the SCS may be 1.25 MHz, the GI may be selected with a short GI duration of 25 ns, a normal GI duration of 50 ns, or a long GI duration of 100 ns, and the tone plan may be an IEEE 802.11be tone plan corresponding to 40 MHz for a 484-tone resource unit (RU484) or an IEEE 802.11ac tone plan corresponding to 160 MHz. Alternatively, the SCS may be 2.5 MHz , the GI may be selected with a short GI duration of 25 ns, a normal GI duration of 50 ns, or a long GI duration of 100 ns, and the tone plan may be the IEEE 802.11be tone plan corresponding to 20 MHz for a 242-tone resource unit (RU242) or the IEEE 802.11ac tone plan corresponding to 80 MHz. Alternatively, the SCS may be 5 MHz, the GI may be selected with a short GI duration of 12.5 ns, 18.75 ns or 25 ns, a normal GI duration of 25 ns, 37.5 ns or 50 ns, or a long GI duration of 50 ns, 75 ns or 100 ns, and the tone plan may be the IEEE 802.11ac tone plan corresponding to 40 MHz.

In some implementations, in communicating, process 2200 may involve processor 2112 communicating in a 960 MHz channel bandwidth. Moreover, the SCS may be 1.875 MHz, the GI may be selected with a short GI duration of 16.667 ns, a normal GI duration of 33.333 ns, or a long GI duration of 66.667 ns, and the tone plan may be an IEEE 802.11be tone plan corresponding to 40 MHz for a 484-tone resource unit (RU484) or an IEEE 802.11ac tone plan corresponding to 160 MHz. Alternatively, the SCS may be 3.75 MHz, the GI may be selected with a short GI duration of 16.667 ns, a normal GI duration of 33.333 ns, or a long GI duration of 66.667 ns, and the tone plan may be the IEEE 802.11be tone plan corresponding to 20 MHz for a 242-tone resource unit (RU242) or the IEEE 802.11ac tone plan corresponding to 80 MHz.

In some implementations, in communicating, process 2200 may involve processor 2112 communicating in a 1280 MHz channel bandwidth. Moreover, the SCS may be 1.25 MHz, the GI may be selected with a short GI duration of 25 ns, a normal GI duration of 50 ns, or a long GI duration of 100 ns, and the tone plan may be an IEEE 802.11be tone plan corresponding to 80 MHz for a 996-tone resource unit (RU996). Alternatively, the SCS may be 2.5 MHz , the GI may be selected with a short GI duration of 25 ns, a normal GI duration of 50 ns, or a long GI duration of 100 ns, and the tone plan may be the IEEE 802.11be tone plan corresponding to 40 MHz for a 484-tone resource unit (RU484) or the IEEE 802.11ac tone plan corresponding to 160 MHz. Alternatively, the SCS may be 5 MHz, the GI may be selected with a short GI duration of 12.5 ns, 18.75 ns or 25 ns, a normal GI duration of 25 ns, 37.5 ns or 50 ns, or a long GI duration of 50 ns, 75 ns or 100 ns, and the tone plan may be the IEEE 802.11be tone plan corresponding to 20 MHz for RU242 or the IEEE 802.11ac tone plan corresponding to 80 MHz.

In some implementations, in communicating, process 2200 may involve processor 2112 communicating in a 2560 MHz channel bandwidth. Moreover, the SCS may be 1.25 MHz, the GI may be selected with a short GI duration of 25 ns, a normal GI duration of 50 ns, or a long GI duration of 100 ns, and the tone plan may be an IEEE 802.11be tone plan corresponding to 160 MHz for two 996-tone resource units (RU2x996). Alternatively, the SCS may be 2.5 MHz , the GI may be selected with a short GI duration of 25 ns, a normal GI duration of 50 ns, or a long GI duration of 100 ns, and the tone plan may be the IEEE 802.11be tone plan corresponding to 80 MHz for a 996-tone resource unit (RU996). Alternatively, the SCS may be 5 MHz, the GI may be selected with a short GI duration of 12.5 ns, a normal GI duration of 25 ns, or a long GI duration of 50 ns, and the tone plan may be the IEEE 802.11be tone plan corresponding to 40 MHz for a 484-tone resource unit (RU484) or the IEEE 802.11ac tone plan corresponding to 160 MHz.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
communicating, by a processor of a first apparatus, in a 60 GHz frequency band wirelessly with a second apparatus by either or both:
    transmitting first data or first information to the second apparatus; and
    receiving second data or second information from the second apparatus,
wherein the communicating in the 60 GHz frequency band wirelessly comprises communicating in the 60 GHz frequency band wirelessly based on a scalable waveform and numerology design with at least one of:
    selection of a specific subcarrier spacing (SCS);
    selection of a specific guard interval (GI) design; and
    reuse of a preexisting channelization or tone plan,
wherein the communicating comprises communicating in a 160 MHz or 320 MHz or 480 MHz or 640 MHz or 960 MHz or 1280 MHz or 2560 MHz channel bandwidth,
wherein, responsive to communicating in the 160 MHz channel bandwidth:
    the SCS is 0.625 MHz, the GI is selected with a short GI duration of 50 ns or 25 ns, a normal GI duration of 100 ns or 50 ns, or a long GI duration of 200 ns or 100 ns, and the tone plan is an Institute of Electrical and Electronics Engineers (IEEE) 802.11be tone plan corresponding to 20 MHz for a 242-tone resource unit (RU242) or an IEEE 802.11ac tone plan corresponding to 80 MHz; or
    the SCS is 1.25 MHz, the GI is selected with the short GI duration of 25 ns, the normal GI duration of 50 ns, or the long GI duration of 100 ns, and the tone plan is an IEEE 802.11ac tone plan corresponding to 40 MHz; or
    the SCS is 2.5 MHz, the GI is selected with the short GI duration of 25 ns, the normal GI duration of 50 ns, or the long GI duration of 100 ns, and the tone plan is the IEEE 802.11ac tone plan corresponding to 40 MHZ,
wherein, responsive to communicating in the 320 MHz channel bandwidth:
    the SCS is 1.25 MHz, the GI is selected with the short GI duration of 25 ns, the normal GI duration of 50 ns, or the long GI duration of 100 ns, and the tone plan is an IEEE 802.11be tone plan corresponding to 40 MHz for the RU242 or the IEEE 802.11ac tone plan corresponding to 80 MHz; or
    the SCS is 2.5 MHz, the GI is selected with the short GI duration of 25 ns, the normal GI duration of 50 ns, or the long GI duration of 100 ns, and the tone plan is the IEEE 802.11ac tone plan corresponding to 40 MHz; or
    the SCS is 5 MHz, the GI is selected with the short GI duration of 12.5 ns, 18.75 ns or 25 ns, the normal GI duration of 25 ns, 37.5 ns or 50 ns, or the long GI duration of 50 ns, 75 ns or 100 ns, and the tone plan is the IEEE 802.11ac tone plan corresponding to 20 MHZ,
wherein, responsive to communicating in the 480 MHz channel bandwidth:
    the SCS is 1.875 MHz, the GI is selected with the short GI duration of 33.333 ns, the normal GI duration of 66.667 ns, or the long GI duration of 133.333 ns, and the tone plan is the IEEE 802.11be tone plan corresponding to 20 MHz for the RU242 or the IEEE 802.11ac tone plan corresponding to 80 MHz; or
    the SCS is 3.75 MHz, the GI is selected with the short GI duration of 16.667 ns, the normal GI duration of 33.333 ns, or the long GI duration of 66.667 ns, and the tone plan is the IEEE 802.11ac tone plan corresponding to 40 MHz,
wherein, responsive to communicating in the 640 MHz channel bandwidth:
    the SCS is 1.25 MHz, the GI is selected with the short GI duration of 25 ns, the normal GI duration of 50 ns, or the long GI duration of 100 ns, and the tone plan is the IEEE 802.11be tone plan corresponding to 40 MHz for a 484-tone resource unit (RU484) or an IEEE 802.11ac tone plan corresponding to 160 MHz; or the SCS is 2.5 MHz, the GI is selected with the short GI duration of 25 ns, the normal GI duration of 50 ns, or the long GI duration of 100 ns, and the tone plan is the IEEE 802.11be tone plan corresponding to 20 MHz for the RU242 or the IEEE 802.11ac tone plan corresponding to 80 MHz; or the SCS is 5 MHz, the GI is selected with the short GI duration of 12.5 ns, 18.75 ns or 25 ns, the normal GI duration of 25 ns, 37.5 ns or 50 ns, or the long GI duration of 50 ns, 75 ns or 100 ns, and the tone plan is the IEEE 802.11ac tone plan corresponding to 40 MHz, wherein, responsive to communicating in the 960 MHz channel bandwidth:

the SCS is 1.875 MHz, the GI is selected with the short GI duration of 16.667 ns, the normal GI duration of 33.333 ns, or the long GI duration of 66.667 ns, and the tone plan is the IEEE 802.11be tone plan corresponding to 40 MHz for the RU484 or the IEEE 802.11ac tone plan corresponding to 160 MHz; or the SCS is 3.75 MHz, the GI is selected with the short GI duration of 16.667 ns, the normal GI duration of 33.333 ns, or the long GI duration of 66.667 ns, and the tone plan is the IEEE 802.11be tone plan corresponding to 20 MHz for the RU242 or the IEEE 802.11ac tone plan corresponding to 80 MHZ, wherein, responsive to communicating in the 1280 MHz channel bandwidth:

the SCS is 1.25 MHz, the GI is selected with the short GI duration of 25 ns, the normal GI duration of 50 ns, or the long GI duration of 100 ns, and the tone plan is an IEEE 802.11be tone plan corresponding to 80 MHz for a 996-tone resource unit (RU996); or the SCS is 2.5 MHz, the GI is selected with the short GI duration of 25 ns, the normal GI duration of 50 ns, or the long GI duration of 100 ns, and the tone plan is the IEEE 802.11be tone plan corresponding to 40 MHz for the RU484 or the IEEE 802.11ac tone plan corresponding to 160 MHz; or the SCS is 5 MHz, the GI is selected with the short GI duration of 12.5 ns, 18.75 ns or 25 ns, the normal GI duration of 25 ns, 37.5 ns or 50 ns, or the long GI duration of 50 ns, 75 ns or 100 ns, and the tone plan is the IEEE 802.11be tone plan corresponding to 20 MHz for RU242 or the IEEE 802.11ac tone plan corresponding to 80 MHz, wherein, responsive to communicating in the 2560 MHz channel bandwidth:

the SCS is 1.25 MHz, the GI is selected with the short GI duration of 25 ns, the normal GI duration of 50 ns, or the long GI duration of 100 ns, and the tone plan is an IEEE 802.11be tone plan corresponding to 160 MHz for two 996-tone resource units (RU2x996); or the SCS is 2.5 MHz, the GI is selected with the short GI duration of 25 ns, the normal GI duration of 50 ns, or the long GI duration of 100 ns, and the tone plan is the IEEE 802.11be tone plan corresponding to 80 MHz for the RU996; or the SCS is 5 MHz, the GI is selected with the short GI duration of 12.5 ns, the normal GI duration of 25 ns, or the long GI duration of 50 ns, and the tone plan is the IEEE 802.11be tone plan corresponding to 40 MHz for the RU484 or the IEEE 802.11ac tone plan corresponding to 160 MHz.

2. The method of claim 1, wherein the selection of the specific SCS comprises selection of the SCS to support a fast Fourier transform (FFT) size of less than or equal to 4096, and wherein:

the SCS is selected from [625 kHz, 1250 kHz, 2500 kHz, 5000 KHz]; or the SCS is selected from [625 kHz, 937.5 kHz, 1250 kHz, 1562.5 kHz, 2187.5 kHz, 2500 kHz, 2812.5 kHz, 3125 kHz, 3437.5 kHz, 4375 kHz, 4687.5 kHz, 5000 KHz]; or the SCS is 312.5 kHz*n; or the SCS is 78.125 kHz*n, n being a positive integer.

3. The method of claim 1, wherein the selection of the specific GI design comprises selection of a GI with a GI duration $(T_{gi})=T_{dft}/64$, $T_{dft}/32$, $T_{dft}/16$, $T_{dft}/8$ or $T_{dft}/4$, and wherein $T_{dft}$ denotes an orthogonal frequency-division multiplexing (OFDM) symbol duration.

4. The method of claim 1, wherein the reuse of the preexisting channelization or tone plan comprises reuse of an Institute of Electrical and Electronics Engineers (IEEE) 802.11ac, IEEE 802.11ax or IEEE 802.11be tone plan.

5. An apparatus, comprising:
a transceiver configured to communicate wirelessly; and
a processor coupled to the transceiver and configured to perform operations comprising:
communicating, via the transceiver, in a 60 GHz frequency band wirelessly with one other apparatus by either or both:
transmitting first data or first information to the other apparatus; and
receiving second data or second information from the other apparatus,
wherein, in communicating in the 60 GHz frequency band wirelessly, the processor is configured to communicate in the 60 GHz frequency band wirelessly based on a scalable waveform and numerology design with at least one of:
selection of a specific subcarrier spacing (SCS);
selection of a specific guard interval (GI) design; and
reuse of a preexisting channelization or tone plan,
wherein the communicating comprises communicating in a 160 MHz or 320 MHz or 480 MHz or 640 MHz or 960 MHz or 1280 MHz or 2560 MHz channel bandwidth,
wherein, responsive to communicating in the 160 MHz channel bandwidth:
the SCS is 0.625 MHz, the GI is selected with a short GI duration of 50 ns or 25 ns, a normal GI duration of 100 ns or 50 ns, or a long GI duration of 200 ns or 100 ns, and the tone plan is an Institute of Electrical and Electronics Engineers (IEEE) 802.11be tone plan corresponding to 20 MHz for a 242-tone resource unit (RU242) or an IEEE 802.11ac tone plan corresponding to 80 MHz; or
the SCS is 1.25 MHz, the GI is selected with the short GI duration of 25 ns, the normal GI duration of 50 ns, or the long GI duration of 100 ns, and the tone plan is an IEEE 802.11ac tone plan corresponding to 40 MHz; or
the SCS is 2.5 MHz, the GI is selected with the short GI duration of 25 ns, the normal GI duration of 50 ns, or the long GI duration of 100 ns, and the tone plan is the IEEE 802.11ac tone plan corresponding to 40 MHZ, wherein, responsive to communicating in the 320 MHz channel bandwidth:
    the SCS is 1.25 MHz, the GI is selected with the short GI duration of 25 ns, the normal GI duration of 50 ns, or the long GI duration of 100 ns, and the tone plan is an IEEE 802.11be tone plan corresponding to 40 MHz for the RU242 or the IEEE 802.11ac tone plan corresponding to 80 MHz; or
    the SCS is 2.5 MHz, the GI is selected with the short GI duration of 25 ns, the normal GI duration of 50 ns, or the long GI duration of 100 ns, and the tone plan is the IEEE 802.11ac tone plan corresponding to 40 MHz; or
    the SCS is 5 MHz, the GI is selected with the short GI duration of 12.5 ns, 18.75 ns or 25 ns, the normal GI duration of 25 ns, 37.5 ns or 50 ns, or the long GI duration of 50 ns, 75 ns or 100 ns, and the tone plan is the IEEE 802.11ac tone plan corresponding to 20 MHz,
wherein, responsive to communicating in the 480 MHz channel bandwidth:
    the SCS is 1.875 MHz, the GI is selected with the short GI duration of 33.333 ns, the normal GI duration of 66.667 ns, or the long GI duration of 133.333 ns, and the tone plan is the IEEE 802.11be tone plan corresponding to 20 MHz for the RU242 or the IEEE 802.11ac tone plan corresponding to 80 MHz; or
    the SCS is 3.75 MHz, the GI is selected with the short GI duration of 16.667 ns, the normal GI duration of 33.333 ns, or the long GI duration of 66.667 ns, and the tone plan is the IEEE 802.11ac tone plan corresponding to 40 MHz,
wherein, responsive to communicating in the 640 MHz channel bandwidth:
    the SCS is 1.25 MHz, the GI is selected with the short GI duration of 25 ns, the normal GI duration of 50 ns, or the long GI duration of 100 ns, and the tone plan is the IEEE 802.11be tone plan corresponding to 40 MHz for a 484-tone resource unit (RU484) or an IEEE 802.11ac tone plan corresponding to 160 MHz; or
    the SCS is 2.5 MHz, the GI is selected with the short GI duration of 25 ns, the normal GI duration of 50 ns, or the long GI duration of 100 ns, and the tone plan is the IEEE 802.11be tone plan corresponding to 20 MHz for the RU242 or the IEEE 802.11ac tone plan corresponding to 80 MHz; or
    the SCS is 5 MHz, the GI is selected with the short GI duration of 12.5 ns, 18.75 ns or 25 ns, the normal GI duration of 25 ns, 37.5 ns or 50 ns, or the long GI duration of 50 ns, 75 ns or 100 ns, and the tone plan is the IEEE 802.11ac tone plan corresponding to 40 MHz,
wherein, responsive to communicating in the 960 MHz channel bandwidth:
    the SCS is 1.875 MHz, the GI is selected with the short GI duration of 16.667 ns, the normal GI duration of 33.333 ns, or the long GI duration of 66.667 ns, and the tone plan is the IEEE 802.11be tone plan corresponding to 40 MHz for the RU484 or the IEEE 802.11ac tone plan corresponding to 160 MHz; or
    the SCS is 3.75 MHz, the GI is selected with the short GI duration of 16.667 ns, the normal GI duration of 33.333 ns, or the long GI duration of 66.667 ns, and the tone plan is the IEEE 802.11be tone plan corresponding to 20 MHz for the RU242 or the IEEE 802.11ac tone plan corresponding to 80 MHZ,
wherein, responsive to communicating in the 1280 MHz channel bandwidth:
    the SCS is 1.25 MHz, the GI is selected with the short GI duration of 25 ns, the normal GI duration of 50 ns, or the long GI duration of 100 ns, and the tone plan is an IEEE 802.11be tone plan corresponding to 80 MHz for a 996-tone resource unit (RU996); or
    the SCS is 2.5 MHz, the GI is selected with the short GI duration of 25 ns, the normal GI duration of 50 ns, or the long GI duration of 100 ns, and the tone plan is the IEEE 802.11be tone plan corresponding to 40 MHz for the RU484 or the IEEE 802.11ac tone plan corresponding to 160 MHz; or
    the SCS is 5 MHz, the GI is selected with the short GI duration of 12.5 ns, 18.75 ns or 25 ns, the normal GI duration of 25 ns, 37.5 ns or 50 ns, or the long GI duration of 50 ns, 75 ns or 100 ns, and the tone plan is the IEEE 802.11be tone plan corresponding to 20 MHz for RU242 or the IEEE 802.11ac tone plan corresponding to 80 MHz,
wherein, responsive to communicating in the 2560 MHz channel bandwidth:
    the SCS is 1.25 MHz, the GI is selected with the short GI duration of 25 ns, the normal GI duration of 50 ns, or the long GI duration of 100 ns, and the tone plan is an IEEE 802.11be tone plan corresponding to 160 MHz for two 996-tone resource units (RU2x996); or
    the SCS is 2.5 MHz, the GI is selected with the short GI duration of 25 ns, the normal GI duration of 50 ns, or the long GI duration of 100 ns, and the tone plan is the IEEE 802.11be tone plan corresponding to 80 MHz for the RU996; or
    the SCS is 5 MHz, the GI is selected with the short GI duration of 12.5 ns, the normal GI duration of 25 ns, or the long GI duration of 50 ns, and the tone plan is the IEEE 802.11be tone plan corresponding to 40 MHz for the RU484 or the IEEE 802.11ac tone plan corresponding to 160 MHz.

6. The apparatus of claim 5, wherein the selection of the specific SCS comprises selection of the SCS to support a fast Fourier transform (FFT) size of less than or equal to 4096, wherein:
    the SCS is selected from [625 kHz, 1250 kHz, 2500 kHz, 5000 KHz]; or
    the SCS is selected from [625 kHz, 937.5 kHz, 1250 KHz, 1562.5 kHz, 2187.5 kHz, 2500 kHz, 2812.5 kHz, 3125 kHz, 3437.5 kHz, 4375 kHz, 4687.5 kHz, 5000 KHz]; or
    the SCS is 312.5 kHz*n; or
    the SCS is 78.125 kHz*n, n being a positive integer,
    wherein the selection of the specific GI design comprises selection of a GI with a GI duration $(T_{gi})=T_{dft}/64$, $T_{dft}/32$, $T_{dft}/16$, $T_{dft}/8$ or $T_{dft}/4$, and wherein $T_{dft}$ denotes an orthogonal frequency-division multiplexing (OFDM) symbol duration, and
    wherein the reuse of the preexisting channelization or tone plan comprises reuse of an Institute of Electrical and Electronics Engineers (IEEE) 802.11ac, IEEE 802.11ax or IEEE 802.11be tone plan.

* * * * *